Nov. 24, 1964

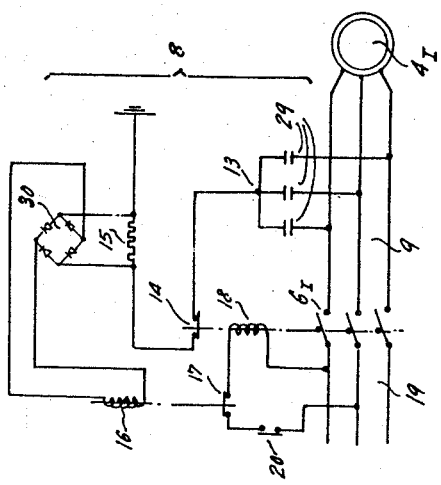

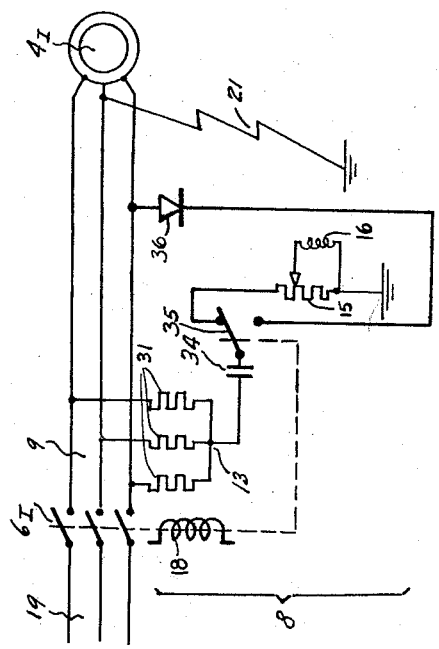
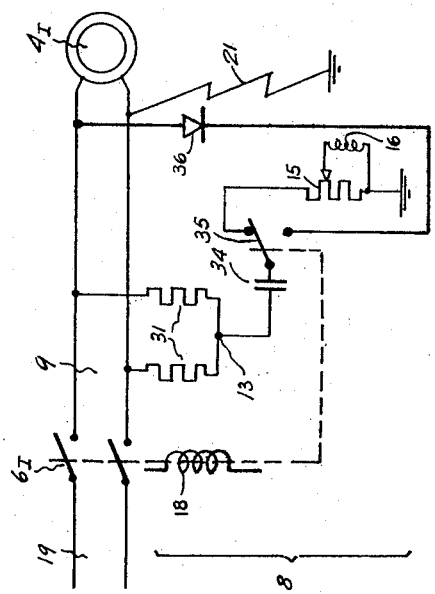

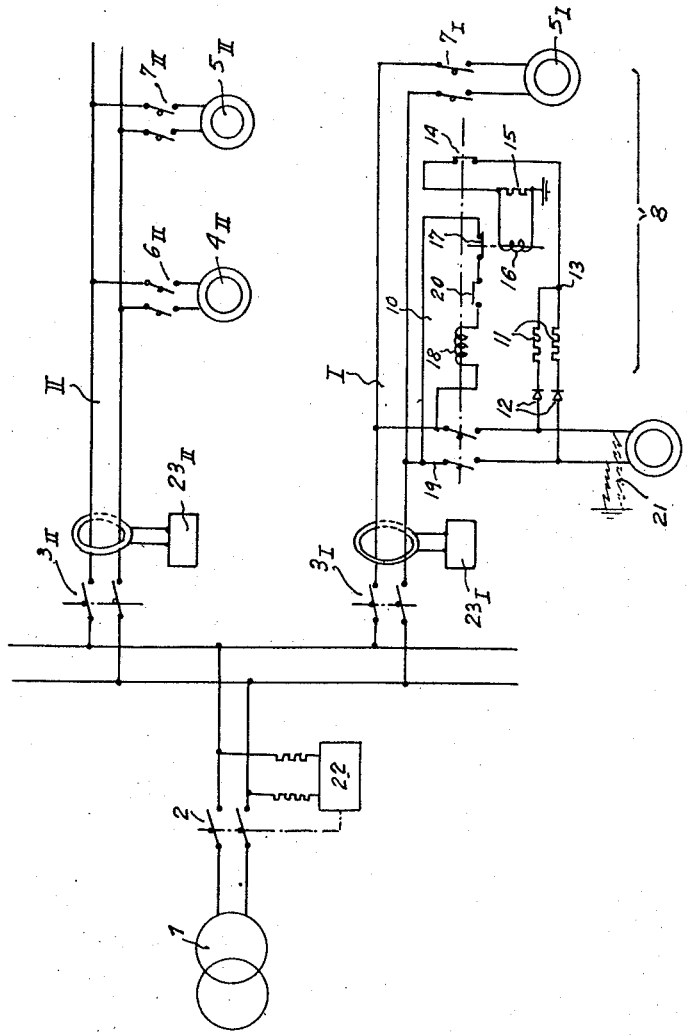

C. GAGNIERE ETAL 3,158,785
DEVICES FOR DETECTING EARTH FAULTS IN
ELECTRIC DISTRIBUTION NETWORKS

Filed June 26, 1962 7 Sheets-Sheet 7

Inventors:
Claude Gagniere and
Pierre Belugou

By Karl W. Flocks
Attorney

United States Patent Office 3,158,785
Patented Nov. 24, 1964

3,158,785
DEVICES FOR DETECTING EARTH FAULTS IN ELECTRIC DISTRIBUTION NETWORKS
Claude Gagniere, Nogent-sur-Oise, and Pierre Belugou, Paris, France, assignors to Charbonnages de France, Paris, France, a public institution of France
Filed June 26, 1962, Ser. No. 205,429
Claims priority, application France, July 3, 1961, 886,785; Mar. 15, 1962, 891,213
12 Claims. (Cl. 317—18)

There exist at the present time current-breaking devices which are installed on electrical networks with the object of ensuring their protection on the occurrence of earth faults. These devices detect the existence of a fault by checking the out-of-balance current or a supervisory direct-current injected between the network and earth, or again by comparing the out-of-balance current with the out-of-balance voltage.

With a single installation, none of the known devices permits the identification of the faulty line when this installation is supervising the outgoing side of a system comprising a number of lines.

The present invention has for its object a method and a device which obviate the major drawback referred to, by making it possible to localize any faulty branch circuit on a system with a number of parallel circuits.

A further object of the invention is to permit, after the tripping of all the circuit-breakers on the network by any earth fault detector of any type, the re-closure of the circuit-breakers of all the branch circuits with the single exception of that which controls the faulty branch circuit.

The method in accordance with the invention is essentially characterized by the fact that it consists in utilizing, for a brief instant after each current interruption, the energy stored in each element of the network which is located on the downstream side of each current breaking apparatus, to supply directly an auxiliary fault-detection device, the function of which is to trip an alarm and eventually to lock the circuit-breaker in the event of fault, and only in this case.

In accordance with a further characteristic feature, the stored energy which is utilized to supply the auxiliary detection device is the kinetic energy of the motors of the different parts of the network, converted to electrical energy by the spontaneous operation of the said motors as generators as soon as an interruption of current takes place on the upstream side.

According to a further feature which can be combined with that preceding when so desired, the stored energy which is utilized to supply the auxiliary detection device is the electric charge of a condenser.

The device according to the invention which carries into effect the above-recited method is essentially characterized by the fact that it comprises, in association with a current-breaking device of the section of network to be supervised, the combination:

of an electric coupling connecting each of the phases of the said section to earth through the intermediary of a common point;
of means for effecting the introduction into circuit of the said electric coupling between the network section and earth, under the influence of the opening of the current-breaking device;
and of a relay maintained in the closed position by a holding winding.

In accordance with a further feature, when the said relay is closed, it prevents the re-closure of the circuit-breaker device.

According to a further feature which can be combined with that above, the closure of the relay actuates an alarm device.

According to a further feature, the relay comprises two opposing magnetic circuits, of which one of the windings is traversed by the polarized current which circulates, in the event of a fault, in the electric connection between phases and earth, and the other opposing winding of which has passing through it a current proportional to the voltage between phases, by virtue of which the operation of the device is independent of the voltage at the terminals of the energy consuming device of the supervised section of the network.

According to a further feature, a polarized relay is employed having two oppositely-acting windings on the same core, one of the windings being traversed by the polarized current circulating, in the event of a fault, in the electric connection between phases and earth, while the other winding has passing through it a current proportional to the voltage between phases, by virtue of which the operation of the device is independent of the voltage at the terminals of the energy-consuming device of the section of network supervised.

In accordance with one form of embodiment, the electrical coupling between the section of network to be supervised and earth comprises a star formed by as many balanced branches as there are phases in the branch circuit supervised, each of the branches of the star being itself constituted by a resistance and a semi-conductor element in series, the said star being connected by the extremities of its branches to the conductors of the parallel circuit supervised and by its common point to earth through the intermediary of a relay held in the closed position by a holding winding, and through the intermediary of an auxiliary contact which is closed when the circuit-breaker device is open and vice-versa.

In accordance with an alternative form of embodiment, the common point of the star is connected to earth through the intermediary of one of the windings of the relay and of an auxiliary contact which is closed when the circuit-breaker device is open and vice-versa, the opposing winding being connected between the said common point of the star and one of the phases of the network section supervised.

According to a further alternative form, each of the branches of the star is constituted by a condenser, the relay held in the closed position by a holding winding being connected to the common coupling through the intermediary of a rectifier bridge.

In accordance with a further form of construction, the common point of the star is connected to earth through the intermediary:

(a) of the diagonal of a rectifier bridge supplied on the other diagonal by a transformer, the primary of which is connected between two conductors of the branch circuit supervised;
(b) of an auxiliary contact which is closed when the circuit-breaker device is open and vice versa; and
(c) a relay held in the closed position by a holding winding.

In accordance with another form of embodiment, a condenser is connected to the terminals of the diagonal of the rectifier bridge through the intermediary of which the common point of the star is connected to earth.

According to a further form of embodiment, each of the branches of the star is constituted by a resistance, the common point of the star being connected to earth through the intermediary of:

(a) a condenser;
(b) a reversing switch; and
(c) a relay held in the closed position by a holding winding, the said reversing switch being connected to the circuit-breaker device in such manner that it puts the condenser into connection with the said relay when the circuit device is open, and puts the said condenser into connection with one of the phases of the network section supervised through the intermediary of a semiconductor element when the circuit-breaker is closed.

In accordance with a further feature of the invention which can be combined with any one of those recited above, the relay held in the closed position by holding is a relay with magnetic holding contact.

Other particular features and advantages of the present invention will become apparent from the description which follows below with reference to the accompanying drawings which represent diagrammatically and by way of example only, various possible forms of embodiment of the present invention.

In these drawings:

FIGS. 6, 7, 7a and 8 represent alternative forms of the detection device for three-phase networks;

FIGS. 9, 10, 11, 11a and 12 are views similar to FIGS. 1, 6, 7, 7a and 8, but relating to the case of the application of the invention to a single-phase network.

Figure 1:
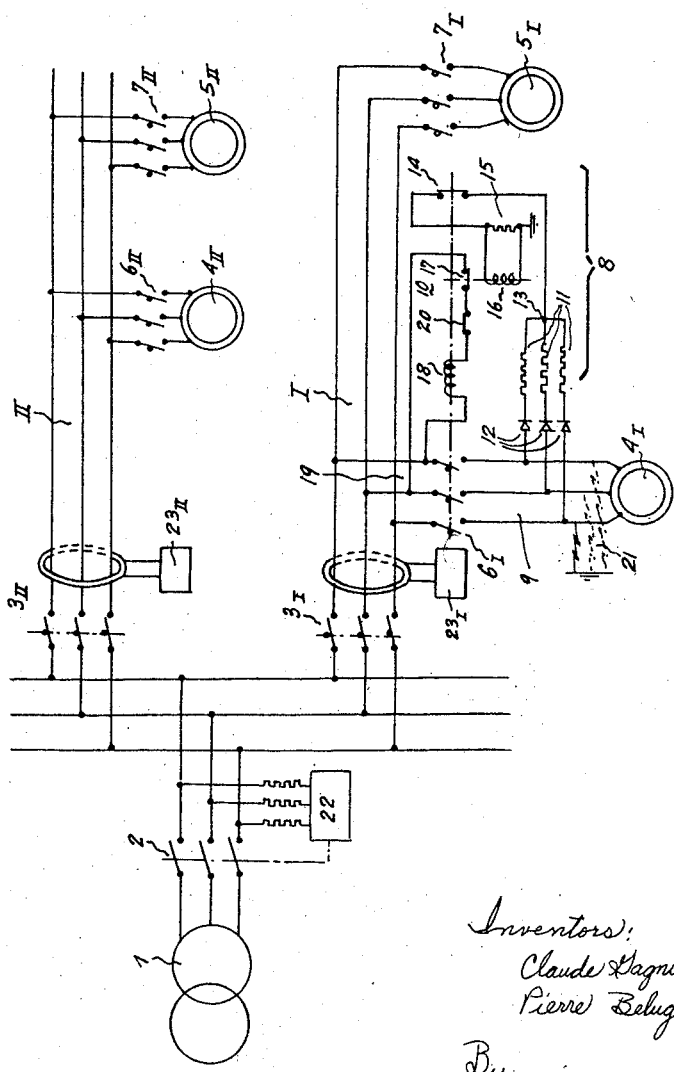
FIG. 1 shows the diagram of the circuit of a three-phase network comprising a device for detecting and localizing earth faults according to the invention.

In FIG. 1 there has been shown the diagram of a three-phase network comprising in the usual manner a power supply transformer 1, a general circuit-breaker 2 and a certain number of branch circuits I, II, etc. connected in parallel and protected by respective secondary circuit-breakers $3_I$, $3_{II}$, etc.

On each branch circuit are connected a certain number of energy-consuming devices such as the motors $4_I$, $5_I$, etc. on the branch circuit I and the motors $4_{II}$, $5_{II}$ on the branch circuit II.

These motors are protected by the respective contactors $6_I$, $7_I$, $6_{II}$, $7_{II}$.

The device according to the invention proper comprises, in association with a current-breaking device, in the present case the contactor $6_I$ of the motor $4_I$:

An electric coupling indicated by the general reference 8, between the downstream portion 9 of the supply circuit of the motor 4 and earth;

A relay unit indicated by the general reference 10, which has the dual task of controlling the operation of contactor $6_I$ and at the same time that of assuring the continuity of the connection 8 between phases and earth when the contactor $6_I$ is open.

In the case of application of the invention to a three-phase network, the electrical connection 8 comprises a star with three balanced branches, each of which is constituted by a resistance 11 and a diode 12. The common point 13 of the star is connected to earth through the intermediary of an auxiliary contact 14 and the coil 16 of a magnetic holding relay actuating the contactor 17 which will be referred to in more detail later. A variable resistance 15 can be connected in parallel to the terminals of the coil 16, if so desired.

The auxiliary contactor 14 is connected in such manner that when the contactor $6_I$ is open, 14 is closed and vice versa.

To this end, the contactor $6_I$ and the auxiliary contactor 14 are controlled by a relay, the coil 18 of which is supplied by a circuit connected to one phase of the upstream portion of the supply circuit of the motor $4_I$, this supply circuit for the coil 18 comprising in addition the contactor 17 actuated by the relay 16, and a resetting contactor 20.

The operation of the circuit arrangement which has been described above is as follows:

When the contactor $6_I$ opens, the auxiliary contactor 14 closes and the motor $4_I$ continues to operate for a short period as a three-phase generator.

Two possibilities can then arise:

(a) There exists no fault of insulation between phases and earth, no current circulates in the connection 8 between the common point 13 and earth, and the relay 16 is not excited;

(b) If, on the other hand, an insulation defect occurs between one, two or three phases and earth (as shown diagrammatically at 21), a polarized current, the source of which is the motor $4_I$ working as a three-phase generator, appears in the connection 8 between the common point 13 and earth when the auxiliary contact 14 closes, that is to say when the contactor $6_I$ opens. If the fault resistance is sufficiently low, the polarized current thus produced has a sufficient value to cause the appearance of a current capable of exciting the coil of the relay 16. This latter which, as has been previously stated, is of the magnetic holding type, opens the contactor 17 and holds it open until unlocked and in consequence interrupts the supply to the operating coil 18 of the contactor $6_I$. The result is that the re-closure of the contactors $6_I$ is then impossible, since any action on the resetting contact 20 remains inoperative as long as the contact 17 remains open. It is an easy matter to combine the action of impossibility of re-closure of the contactor $6_I$ with an alarm action. In order to do this, it is only necessary for the contact 17 of the relay 16, when it opens the supply circuit of the coil 18, to close the supply circuit of an indicator lamp or an alarm bell.

On the other hand, the device for detecting and localizing earth faults may be associated with one or a number of insulation checking devices of conventional type. Thus, for example, there may be associated with the detection device an insulation checking device 22 on the outgoing side of the system and checking devices $23_I$ and $23_{II}$ on the parallel circuits I and II. These checking devices respectively cause the tripping of the main circuit-breaker 2 and the secondary circuit breakers $3_I$ and $3_{II}$ when a resistance fault lower than a certain value appears between one or more phases and earth for example at 21.

In this case, putting the network off-voltage causes the opening of contactors or circuit-breakers provided with minimum-voltage coils, which are installed on this network, and in particular of the contactor $6_I$. This opening causes the operation of the localization devices combined with the contactor $6_I$ which has just been described. It is possible to re-close all the contactors and circuit-breakers of the network, with the single exception of the contactor $6_I$.

It is important to note that when the contactor $6_I$ opens while putting the network off-voltage, this opening is effected with a certain delay due to the working of the motor $4_I$ as a generator, but that on the other hand, this is not the case when the contactor $6_I$ opens by a normal action due to the putting off-voltage of its excitation coil 18. The result is therefore that the fault detector and localizer is less sensitive in the first case than in the second.

Figure 2:
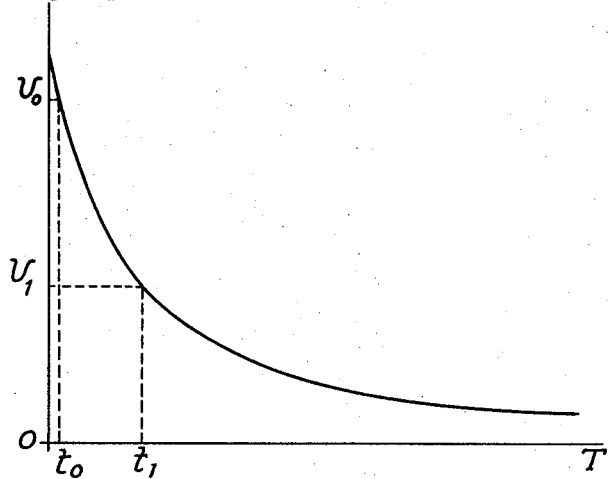
FIG. 2 is an explanatory diagram showing the difference in sensitivity in the operation of the device, depending on whether the current interruption is effected by means of the contactor of one of the energy-consuming devices or by means of the general circuit-breaker.

This difference in sensitivity of operation is due to the fact that (see FIG. 2) the voltage supplied by the motor after the source of supply of the network has been disconnected, decreases following an exponential law.

It can be seen that if the disconnection of the motor of the source is effected by means of the contactor controlling the motor, which is the case during normal operations, the current will begin to circulate in the relay starting from the time $t_0$ which elapses between the extinction of the breaking arc of the contactor and the closure of the auxiliary contact rigidly fixed to the main contacts. This time, of the order of two or three cycles, will therefore be very short.

If on the other hand the disconnection of the motor from the source is effected by means of the general circuit-breaker, operating for example under the action of the insulation checking device, the contactor will only open at the end of a time $t_1$ such that, at that moment, the voltage of the motor working as a generator, has fallen to a value $U_1$ corresponding to the tripping voltage of the contactor. The current will therefore only begin to circulate through the relay at the end of this time $t_1$, since the time which has elapsed between the opening of the main contacts and the closure of the auxiliary contact is negligible as compared with $t_1$. It therefore appears that for a same value of fault, the sensitivity of operation will be lower in this second case than in that of the opening of the contactor during normal operation.

In accordance with a particular feature of the present invention, advantage is taken of this difference in sensitivity to cause the detection-localization device for faults to act with a two-fold function of indication of faults of high resistance and of impossibility of re-closure of the contactor for faults of lower resistance.

Figure 3:
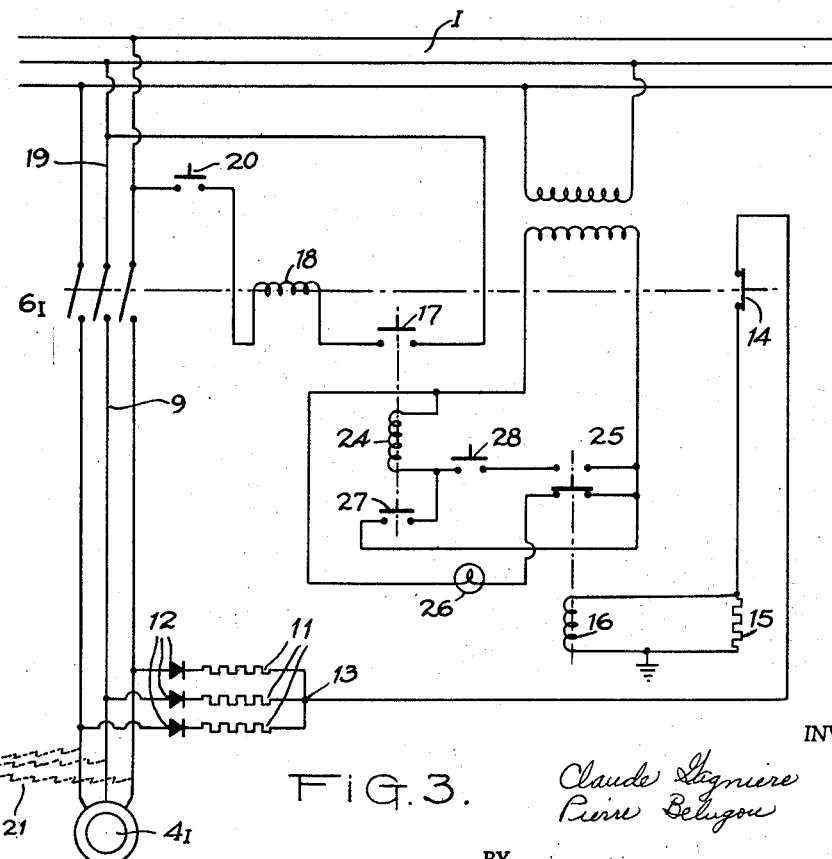
FIG. 3 is a detail view showing the circuit diagram of an alternative form of the electric resetting circuit of the relay of the circuit-breaker device.

In order to do this, the circuit shown by way of example in FIG. 3 can be adopted with advantage.

It can be seen that in this case, the contact 17 causing the interruption of the supply to the coil 18 of the contactor $6_I$ is actuated by the coil 24 of an auxiliary relay in the re-setting circuit of which is inserted a contact 25 actuated by the coil 16 of the relay subjected to the action of the current passing in the electric connection 8 as in FIG. 1. It should be noted that when the contact 25 is actuated by the coil 16, it passes into a position in which it closes the supply circuit of an indicator lamp 26. On the other hand, the coil of relay 24 operates, simultaneously with the contact 17, a contact 27 inserted in a circuit connected in parallel with the circuit which includes the contact 25. Finally, re-setting contacts 20 and 28 are respectively inserted in series with the coil 18 and with the coil 24.

In order to explain the operation of the system which has just been described, it will be assumed that the whole circuit has been adjusted, for example, under the following conditions.

The insulation control devices 22, $23_I$, $23_{II}$ cause the network to be put off-voltage for a fault value of a resistance of 5,000 ohms, while the detection and localization device detects:

On the one hand, an earth fault with a resistance of 6,000 ohms in the case of the network being put off-voltage;
On the other hand, a fault having a resistance of 12,000 ohms in the case of a normal opening operation of the contactor $6_I$.

Under the adjustment conditions specified above, it can be seen that the indicator lamp will be lighted in the case of faults between 12,000 ohms and 5,000 ohms, and that on the other hand, it will be impossible to re-set the relay 24 and thus to re-close the relay 18 of the contactor $6_I$ when the network has been put off-voltage by the operation of the insulation controllers 22 or $23_I$ on the appearance of a fault having a resistance less than 5,000 ohms.

According to a further feature of the present invention, it is possible, when so desired, to eliminate purely and simply the difference in sensitivity of operation of the device, depending on whether the disconnection of the motor has been made in consequence of normal operation or under the action of the general circuit-breaker operating for example upon the action of the insulation controller. In order to do this, it is only necessary to replace the simple relay of FIG. 1 by a relay with two opposing magnetic circuits, the threshold of operation of which is independent of the value of the voltage at the terminals of the motors at the moment of closure of the auxiliary contact, from which it results that the sensitivity of operation is only slightly different, whether the contactor opens during a normal operation or due to lack of voltage after opening of the general circuit-breaker.

Figure 4:
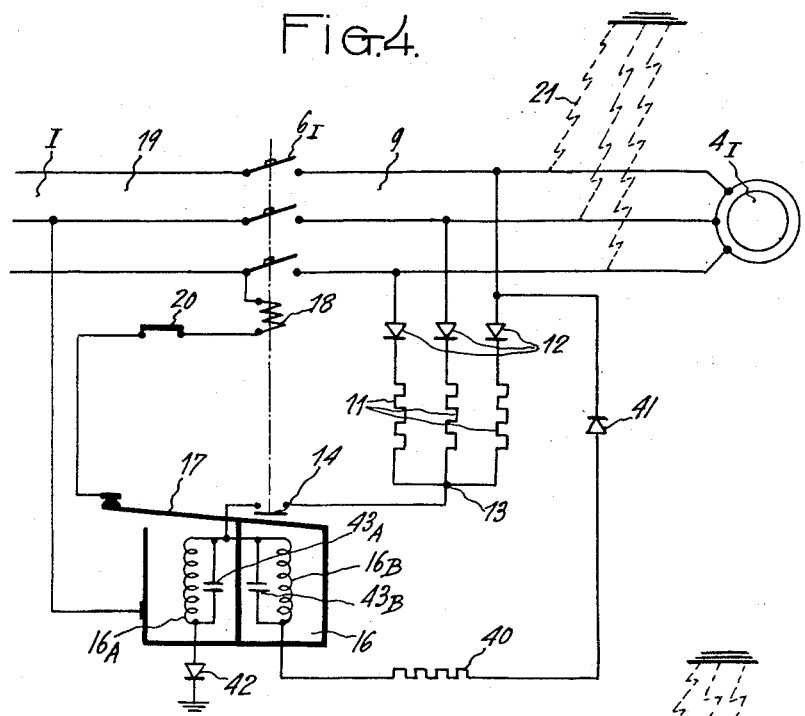
FIGS. 4 and 5 are detail views representing two possible forms of construction of the circuit of the current-breaking device of an energy-consumption apparatus.

According to a first form of possible construction, the connection diagram shown in FIG. 4 may be adopted.

It can be seen that in this case, the contact 17 is constituted by the moving system of a relay 16 having two opposed magnetic circuits, of which one of the windings $16_A$ is traversed by the polarized current circulating in the case of a fault between the common point 13 of the star with three branches constituted by the resistances 11 and the diodes 12, and the other opposing winding $16_B$ of which has passing through it a current proportional to the voltage between phases. In order to avoid earthing the phase to which the winding $16_B$ is connected through the intermediary of the resistance 40, through this resistance 40 and the two windings in series $16_A$ and $16_B$, there is provided on the one hand a diode 41 between the winding $16_B$ and the phase and, on the other hand, a diode 42 between the winding $16_A$ and earth. In this circuit, it can be seen that the windings $16_A$ and $16_B$ are only traversed by a current after the closure of the auxiliary contact 14.

On the other hand, it should be noted that condensers $43_A$ and $43_B$ are preferably mounted at the respective terminals of the windings $16_A$ and $16_B$, these condensers having the effect of attenuating the alternating component to the maximum extent and even of bringing it to zero. An identical result could be obtained by means of an additional winding mounted in short-circuit on each core.

Figure 5:
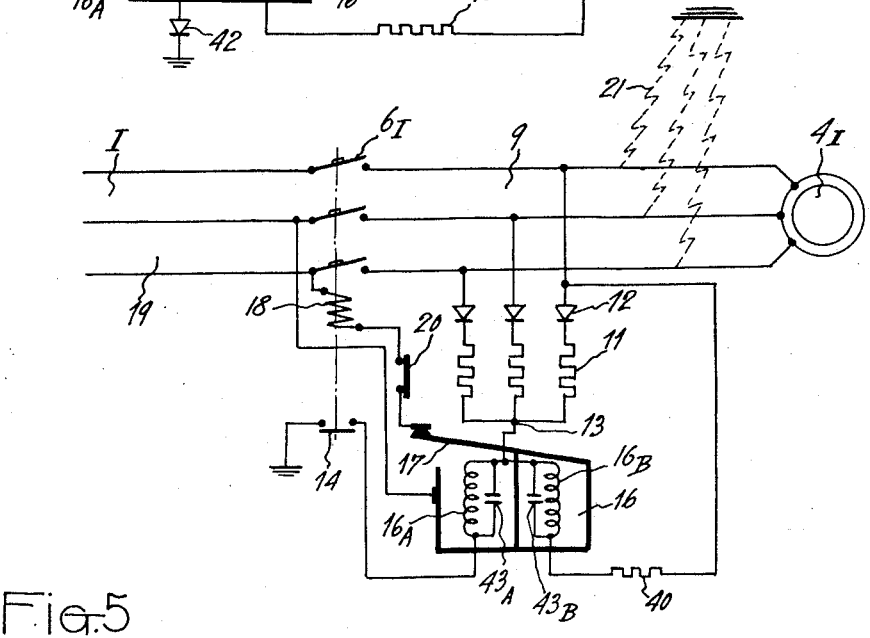
Figure 11:
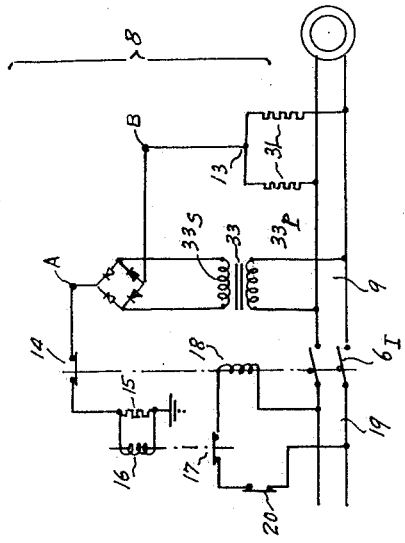
Figure 10:
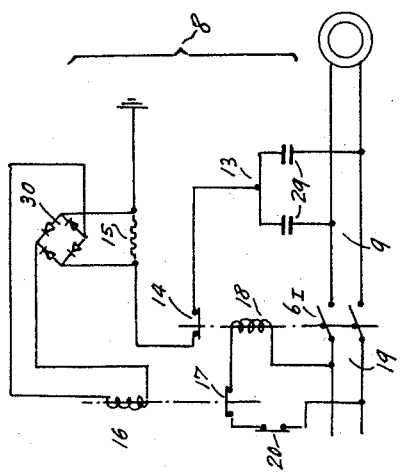
Figure 11A:
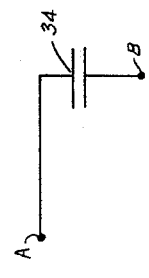

In accordance with a possible alternative form of construction, the connection diagram shown in FIG. 5 may also be adopted. The difference between this latter diagram and that of FIG. 4 resides in that the auxiliary contact 14 is in this case included on the downstream side of the winding $16_A$ on the connection between the neutral point 13 of the star with three arms and earth, instead of being mounted on the upstream side of the said winding $16_A$.

The result of this difference is that the winding $16_A$ is only traversed by the polarized current circulating in the case of a fault after the closure of the auxiliary contact 14, whereas the winding $16_B$ is traversed by a continuous current. As can be seen, this latter circuit enables the addition of the diodes 41 and 42 in the circuit of FIG. 4 to be dispensed with but on the other hand it has the disadvantage of involving a continuous dissipation of heat in the resistance 40.

It is important to note that instead of a relay with two magnetic circuits, use may also be made of a polarized relay comprising two oppositely-acting windings $16_A$ and $16_B$, mounted on the same core, the electric circuit diagrams being furthermore identical with those that have just been described for relays with two magnetic circuits.

It will briefly be recalled that in relays with two opposing magnetic circuits or in polarized relays with two opposed windings of the type of those which have just been described, the moving system, in the present case the vane 17, is subjected to the attraction of two couples acting in opposition, to the exclusion of any other, one of which is a function of the voltage of the network, the insulation of which is to be supervised, and the other is a function, of the same order of magnitude as that preceding, of the value of the polarized current circulating in the common connection between the phases of the network and earth, the algebraic ratio of the two above functions being a constant for each position corresponding to equality of the opposing couples. From this it clearly results, as already explained above, that the threshold of operation of the relay 16 is independent of the value of the voltage at the terminals of the motor $4_I$ at the moment of closure of the auxiliary contact 14, and that in consequence the sensitivity of operation of the device is very little different whether the contactor is opened by a normal operation or by lack of voltage after breaking of the general circuit-breaker.

In FIG. 6, which represents an alternative form of construction of the detection and localization device, all the elements identical with those of FIG. 1 have been given the same references as on this latter figure.

In accordance with this form of embodiment, each of the three balanced arms of the star of the connection 8 comprises a condenser 29. On the other hand, the coil 16 which actuates the contact 17 is supplied from the common connection through the intermediary of a conventional rectifier bridge 30. When so required, a resistance 15 is connected in parallel on the supply of the rectifier bridge.

It can be seen that when the contactor $6_I$ opens, the contact 14 closes and the motor $4_I$ continues to work as a three-phase generator for a short period of time.

If there is no fault, no current appears in the connection 8 between the common point 13 and earth. If, on the other hand, a fault exists between phase and earth, an out-of-balance current is produced in the connection 8 and a voltage appears at the terminals of the relay coil 16 which causes the opening of the contact 17 if the out-of-balance current is sufficiently large, that is to say if the resistance of the fault is sufficiently low.

It should be noted that the circuit which has just been described with reference to FIGURE 6 is not operative if the three phases of the network have an insulation defect of identically the same value with respect to earth.

In accordance with a further alternative form of embodiment shown in FIG. 7, each arm of the three-arm star of the connection 8 is constituted by a resistance 31. The common point 13 of the star is connected to earth through the intermediary of:

The contact 14, actuated as in the previous cases by the relay 18 of the contactor $6_I$ in such manner that it is closed when the said contactor is open, and vice versa;
The coil 16 of the control relay of the contactor 17, to the terminals of which there may be optionally connected a variable resistance 15; and
A diagonal of a rectifier bridge 32.

The other diagonal of the bridge 32 is connected to the terminals of the secondary 33s of a transformer 33, of which the primary 33p is connected between two phases of the downstream portion 9 of the supply circuit of the motor $4_I$.

It can be seen that when the contactor $6_I$ opens, the contact 14 closes the connection 8 to earth. The motor $4_I$ continues to work for a short period of time as a three-phase generator, and a voltage appears at the terminals of the bridge 32, but no current is established in the connection 8 between the common point 13 and earth if there is no fault between phases and earth. If on the other hand there is a fault between phases and earth, a current is established in the said connection 8, which causes excitation of the relay 16 if the current is sufficiently large, that is to say if the fault resistance has a sufficiently small value.

The circuit which has just been described may eventually be completed by the additional element connected at points A and B shown in FIG. 7a wherein a condenser 34 is connected in parallel with the diagonal of the bridge 32, which is in series in the connection between the common point 13 and earth.

In this case, it is seen that when the contactor opens, the energy, which in the case of a fault between phases and earth ensures the passage of the current between the common point 13 and earth, is the sum of the energy supplied by the motor $4_I$ working as a three-phase generator and the energy stored in the condenser 34. It appears that with this solution, detection is obtained even if the motor has received only a current impulse insufficient to cause it to start-up fully.

According to a further alternative and simplified form, of which a possible circuit has been shown in FIG. 8, only the energy stored in a condenser is employed.

In order to avoid useless complication of the drawings and the description, only the connection 8 between the supply system of the motor $4_I$ and earth has been shown, the remainder of the circuit being similar to that already described and shown in connection with the forms of embodiment previously referred to.

According to this form of embodiment, the condenser 34 is connected between the common point 13 of the star with three arms comprising the resistances 31 and a reversing switch 35, which is intended to put the downstream terminal of the condenser 34 into connection either with a diode 36 coupled to one of the phases of the downstream portion 9 of the supply circuit of the motor $4_I$, or with the coil 16 of the control relay of contact 17 placed in the supply circuit of the control relay of the contactor $6_I$.

The change-over switch 35 is connected to the contactor $6_I$ in such manner that when the said contactor is closed, the change-over switch puts the condenser into connection with the diode 36, whereas it connects it to earth through the intermediary of the coil 16, when the contactor is open.

It can be seen that when the contactor $6_I$ is closed, the condenser 34 is charged by a voltage in the vicinity of the peak value of the voltage of the network connected in star. When the contactor $6_I$ opens, the change-over switch 35 causes the condenser 34 to discharge through the coil 16, earth and the fault 21. A current having an exponential law of decay causes the closure of the relay 16 if its value is sufficiently high, that is to say if the fault has a sufficiently low resistance.

It is quite clear that the present invention is equally well applicable to the detection and to localization of earth faults in single-phase networks as in three-phase systems.

In FIGS. 9, 10, 11, 11a and 12, there have been shown circuit diagrams for single-phase networks corresponding respectively to the circuits for three-phase networks shown in FIGS. 1, 6, 7, 7a and 8. In the corresponding figures for three-phase and single-phase, the same elements have been given the same references.

A comparative examination of each of the groups of two figures referred to above makes it clear that the circuit diagrams are absolutely identical with the single exception that the star with a common point 13 for the connection 8 connecting the downstream portion 9 of the supply circuit of the motor $4_I$ to earth only comprises two balanced arms instead of three arms.

The principle of operation of the circuits for single-phase networks is strictly identical with that of the circuits for three-phase networks. In order not to complicate the description unduly, the operation of the circuits for single-phase working will not be repeated here.

It should also be noted that, as in the case of the three-phase networks, it is also possible with single-phase: either to take advantage of the difference in sensitivity of operation of the device so as to obtain a double function of indication for faults of high resistance and impossibility of reclosure of the contactor in the case of faults of lower resistance; or on the other hand to eliminate this difference in sensitivity by utilizing a relay with two opposing magnetic circuits.

It can be seen from the description which has been given that the device according to the invention is ready to operate so as to give an alarm or to prevent the reclosure of the contactor on the branch circuit at fault, whenever the circuit-breaker with which it is associated interrupts the current, and in particular when it breaks the circuit due to lack of voltage following the action of the detector of an earth fault located on the upstream side.

It can also be seen that a very great advantage of the invention resides in the fact of testing the parallel circuit to be supervised for a brief moment after each current interruption, at a high voltage in the vicinity of the rated service voltage and, not as in the case of the devices known at present, at a low voltage with a supervisory current superimposed on the industrial current. The obvious advantage of this new method of operation is to be able to detect the existence of earth faults of not-negligible impedance by causing, under normal voltage, the breakdown of any insulator which has become too weak, which breakdown obviously cannot possibly be produced by the single effect of a low supervisory voltage.

We claim:

1. A device for detecting and localizing earth faults in electrical networks comprising network sections and current-breaking apparatus in each of said network sections, said device comprising in combination, for each of said network sections:

an electrical connection coupling each of the phases of said section to earth through the intermediary of a common point;

electrical switch holding means adapted to cause the putting in circuit of said electrical connection between the network section and earth, under the influence of the opening of the current-breaking apparatus of said network section;

said electrical switch holding means including a holding winding for effecting the operation of the current breaking apparatus and connected on the source side of said current-breaking apparatus;

a contact means in said electrical connection held in the closed position between phases and earth by the opening of the current-breaking apparatus of the network section;

a relay means in the circuit of said electrical connection between phases and earth supplied through series circuitry with said contact means, immediately after the opening of the current-breaking apparatus of the network section, by the energy stored in said network section which is supervised; and a contactor in circuit with said holding winding and controlled by said relay means for movement to a locked open position.

2. A device as claimed in claim 1 wherein said electrical connection comprises a star formed by as many balanced arms as there are phases in said section, each of the arms of the star being itself constituted by a resistance and a semi-conductor element in series, said star being connected by the extremities of its arms to the phases of said network section to be supervised.

3. A device as claimed in claim 2 wherein said relay means comprises two oppositely-acting magnetic circuits, of which one of the windings is connected in series in said electrical connection between phases of the section to be supervised and earth, while the other opposing winding is connected between the common point of the star of said electrical connection and one of the phases of said network section to be supervised.

4. A device as claimed in claim 1 wherein said electrical connection comprises a star formed by as many balanced arms as there are phases in said section, each of the arms of the star including a condenser, said star being connected by the extremities of its arms to the phases of said network section to be supervised; and said relay means connected in the circuit of said electrical connection through the intermediary of a rectifier bridge 5. A device as claimed in claim 1 wherein said electrical connection includes the connection of said common point to earth through the intermediary of the diagonal of a rectifier bridge supplied on the other diagonal by a transformer, the primary of which is connected between two conductors of said network section.

6. A device as claimed in claim 1 wherein said electrical connection includes a star formed by as many balanced arms as there are phases in said section, each of said arms including a resistance, said common point connected to earth through the intermediary of a condenser, said contact means being a change-over switch, said change-over switch being coupled to the current-breaking apparatus in such manner that it puts the condenser into connection with said relay when the current-breaking apparatus is open, and puts said condenser into connection with one of the phases of said section through the intermediary of a semi-conductor element, when the current-breaking apparatus is closed.

7. A device as claimed in claim 1, in which the energy stored in the network section which is utilized to supply the relay held in the closed position is the kinetic energy of motors of said section, converted to electrical energy by the spontaneous working of said motors as generators as soon as a current interruption takes place on the upstream side.

8. A device as claimed in claim 1, in which the energy stored in the network section which is utilized to supply the relay held in the closed position is the electrical charge of a condenser.

9. A device as claimed in claim 1, in which the operation of said relay means actuates an alarm device.

10. A device as claimed in claim 1, in which the relay means comprises two oppositely-acting magnetic circuits, of which one of the windings is traversed by the polarized current circulating in the event of a fault, in the electrical connection between phases and earth, and the other opposing winding of which is traversed by a current proportional to the voltage between phases, whereby the operation of the device is independent of the voltage at the terminals of the energy-consuming device of the network section supervised.

11. A device as claimed in claim 1, in which there is employed a polarized relay means with two opposing windings mounted on the same core, one of said windings being traversed by the polarized current circulating, in the event of a fault, in the electrical connection between phases and earth, while the other winding is traversed by a current proportional to the voltage between phases, whereby the operation of the device is independent of the voltage at the terminals of the energy-consuming device of the network section supervised.

12. A device as claimed in claim 5, in which a condenser is connected to said terminals of the diagonal of said rectifier bridge through the intermediary of which said common point is connected to earth.

References Cited by the Examiner

UNITED STATES PATENTS

| 2,070,473 | 2/37 | Currier | 318—87 |
| 2,357,138 | 8/44 | Seeley | 318—18 |
| 2,788,473 | 4/57 | Breckman | 317—154 X |

FOREIGN PATENTS

| 665,576 | 1/52 | Great Britain. |
| 675,514 | 7/52 | Great Britain. |

SAMUEL BERNSTEIN, *Primary Examiner.*

LLOYD McCOLLUM, *Examiner.*